(12) United States Patent
Boussand

(10) Patent No.: US 9,752,069 B2
(45) Date of Patent: Sep. 5, 2017

(54) REFRIGERANT COMPOSITION

(71) Applicant: ARKEMA FRANCE, Colombes (FR)

(72) Inventor: Beatrice Boussand, Sainte Foy les Lyon (FR)

(73) Assignee: ARKEMA FRANCE, Colombes (FR)

(*) Notice: Subject to any disclaimer, the term of this patent is extended or adjusted under 35 U.S.C. 154(b) by 0 days.

(21) Appl. No.: 14/442,855

(22) PCT Filed: Oct. 30, 2013

(86) PCT No.: PCT/FR2013/052594
§ 371 (c)(1),
(2) Date: May 14, 2015

(87) PCT Pub. No.: WO2014/080104
PCT Pub. Date: May 30, 2014

(65) Prior Publication Data
US 2015/0291869 A1  Oct. 15, 2015

(30) Foreign Application Priority Data
Nov. 20, 2012 (FR) .................... 12 61033

(51) Int. Cl.
C09K 5/04 (2006.01)
F25B 1/00 (2006.01)

(52) U.S. Cl.
CPC .......... C09K 5/045 (2013.01); F25B 1/00 (2013.01); C09K 2205/122 (2013.01); C09K 2205/22 (2013.01); C09K 2205/40 (2013.01)

(58) Field of Classification Search
USPC ................. 252/67, 71–77; 62/114
See application file for complete search history.

(56) References Cited

U.S. PATENT DOCUMENTS

| | | | |
|---|---|---|---|
| 2,438,120 A | 3/1948 | Freygang | |
| 2,834,748 A | 5/1958 | Bailey et al. | |
| 2,846,458 A | 8/1958 | Haluska et al. | |
| 2,917,480 A | 12/1959 | Bailey et al. | |
| 5,399,631 A | 3/1995 | Egawa et al. | |
| 5,497,631 A | 3/1996 | Lorentzen et al. | |
| 5,643,492 A * | 7/1997 | Shiflett | C09K 5/045 252/67 |
| 5,688,432 A | 11/1997 | Pearson | |
| 5,722,256 A | 3/1998 | Shiflett | |
| 5,744,052 A | 4/1998 | Bivens | |
| 6,454,960 B1 | 9/2002 | Sunaga et al. | |
| 6,508,950 B1 | 1/2003 | Lim et al. | |
| 6,589,355 B1 | 7/2003 | Thomas et al. | |
| 6,655,160 B2 | 12/2003 | Roberts | |
| 7,914,696 B2 | 3/2011 | Low et al. | |
| 8,070,977 B2 | 12/2011 | Rached | |
| 8,075,798 B2 | 12/2011 | Rached | |
| 8,142,680 B2 | 3/2012 | Rached | |
| 8,246,850 B2 | 8/2012 | Rached | |
| 8,443,624 B2 | 5/2013 | Yamashita | |
| 8,496,845 B2 | 7/2013 | Tsuchiya et al. | |
| 9,057,010 B2 | 6/2015 | Rached | |
| 9,359,540 B2 | 6/2016 | Rached | |
| 2006/0025322 A1* | 2/2006 | Wilson | C08J 9/143 510/408 |
| 2006/0243944 A1 | 11/2006 | Minor et al. | |
| 2006/0243945 A1 | 11/2006 | Minor et al. | |
| 2006/0269484 A1 | 11/2006 | Knopeck et al. | |
| 2007/0108403 A1 | 5/2007 | Sievert et al. | |
| 2008/0230738 A1 | 9/2008 | Minor et al. | |
| 2009/0158771 A1 | 6/2009 | Low et al. | |
| 2009/0249864 A1 | 10/2009 | Minor et al. | |
| 2009/0250650 A1 | 10/2009 | Minor | |
| 2009/0278072 A1 | 11/2009 | Minor | |
| 2009/0305876 A1 | 12/2009 | Singh et al. | |
| 2010/0044619 A1 | 2/2010 | Hulse et al. | |
| 2010/0044620 A1 | 2/2010 | Rached | |
| 2010/0122545 A1 | 5/2010 | Minor et al. | |
| 2011/0079042 A1 | 4/2011 | Yamashita et al. | |
| 2011/0095224 A1 | 4/2011 | Rached | |
| 2011/0108756 A1 | 5/2011 | Tsuchiya et al. | |
| 2011/0162410 A1 | 7/2011 | Low | |
| 2011/0173997 A1 | 7/2011 | Low et al. | |
| 2011/0186772 A1 | 8/2011 | Rached | |
| 2011/0219792 A1 | 9/2011 | Rached | |

(Continued)

FOREIGN PATENT DOCUMENTS

EP 0509673 A1 10/1992
EP 0811670 A1 12/1997

(Continued)

OTHER PUBLICATIONS

International Search Report (PCT/ISA/210) dated Mar. 7, 2014, by the European Patent Office as the International Searching Authority for International Application No. PCT/FR2013/052594.
Donnelly, M. K., et al., "The Flammability of R-245ca", ASHRAE Transactions: Symposia (American Society of Heating, Refrigerating and Air-Conditioning Engineers), 1999, 10 pages, including pp. 1160-1176, ASHRAE, USA.
Van Den Schoor, Filip, University Thesis, "Influence of Pressure and Temperature on Flammability Limits of Combustible Gases in Air," May 2007, 228 pages, Katholieke Universiteit Leuven—Faculteit Ingenieurswetenschappen, Leuven, BE, ISBN 978-90-5682-813-4.
U.S. Appl. No. 15/150,889, Rached.
Rached: Wissam, U.S. Appl. No. 15/150,889, entitled "Ternary Heat-Transfer Fluids Comprising Difluoromelhane, Pentafluoroethane and Tetrafluoropropene," filed in the U.S. Patent and Trademark Office on May 10, 2016.
Third Party Observation mailed May 26, 2014 by the European Patent Office in EP Appln No. 11731420.3 (4 pages).
Takizawa, K., et al., "Flammability Assessment of $CH_2=CFCF_3$: Comparison with Fluoroalkenes and Fluoroalkenes", Journal of Hazardous Materials, vol. 172, No. 2-3, Aug. 18, 2009, pp. 1329-1338, XP026719989, Elsevier B.V.

(Continued)

Primary Examiner — Lauren Crane
(74) Attorney, Agent, or Firm — Buchanan Ingersoll & Rooney P.C.

(57) ABSTRACT

Refrigerant fluids that can be used in different types of compression systems. A composition including between 36 and 39 wt. % of difluromethane (HFC-32), between 28 and 32 wt. % of pentafluoroethane (HFC-125), and between 31 and 35 wt. % of tetrafluoroethane (HFC-134a). The composition may be used as a replacement for R-404A.

12 Claims, No Drawings

(56) References Cited

U.S. PATENT DOCUMENTS

| | | |
|---|---|---|
| 2011/0219815 A1 | 9/2011 | Yana Motta et al. |
| 2011/0240254 A1 | 10/2011 | Rached |
| 2011/0284181 A1 | 11/2011 | Rached |
| 2012/0049104 A1 | 3/2012 | Rached |
| 2012/0056123 A1 | 3/2012 | Rached |
| 2012/0097885 A9 | 4/2012 | Hulse et al. |
| 2012/0144857 A1 | 6/2012 | Rached |
| 2012/0151959 A1 | 6/2012 | Rached |
| 2012/0153213 A1 | 6/2012 | Rached |
| 2012/0159982 A1 | 6/2012 | Rached |
| 2012/0161064 A1 | 6/2012 | Rached |
| 2012/0167615 A1 | 7/2012 | Rached |
| 2012/0255316 A1 | 10/2012 | Andre et al. |
| 2012/0312048 A1 | 12/2012 | Poole et al. |
| 2013/0055733 A1 | 3/2013 | Rached |
| 2013/0055738 A1 | 3/2013 | Rached |
| 2013/0055739 A1 | 3/2013 | Rached |
| 2013/0061613 A1 | 3/2013 | Rached |
| 2013/0096218 A1 | 4/2013 | Rached |
| 2013/0145778 A1 | 6/2013 | Yana Motta et al. |
| 2013/0193369 A1 | 8/2013 | Low |
| 2013/0255284 A1 | 10/2013 | Rached |
| 2014/0075969 A1 | 3/2014 | Guerin et al. |
| 2014/0137578 A1 | 5/2014 | Yana Motta et al. |
| 2014/0223927 A1 | 8/2014 | Pottker et al. |
| 2015/0135765 A1 | 5/2015 | Yana Motta et al. |
| 2015/0184052 A1 | 7/2015 | Rached |
| 2016/0222272 A1 | 8/2016 | Rached |
| 2016/0252283 A1 | 9/2016 | Rached |

FOREIGN PATENT DOCUMENTS

| | | |
|---|---|---|
| KR | 2001-0044992 A | 6/2001 |
| WO | WO 2004/037913 A2 | 5/2004 |
| WO | WO 2004/037913 A3 | 5/2004 |
| WO | WO 2005/105947 A2 | 11/2005 |
| WO | WO 2005/105947 A3 | 11/2005 |
| WO | WO 2007/002625 A2 | 1/2007 |
| WO | WO 2007/053697 A2 | 5/2007 |
| WO | WO 2007/053697 A3 | 5/2007 |
| WO | WO 2007/126414 A2 | 11/2007 |
| WO | WO 2007/126414 A3 | 11/2007 |
| WO | WO 2009/047542 A1 | 4/2009 |
| WO | WO 2009/151669 A1 | 12/2009 |
| WO | WO 2009/154149 A1 | 12/2009 |
| WO | WO 2010/002014 A1 | 1/2010 |
| WO | WO 2010/059677 A2 | 5/2010 |
| WO | WO 2010/059677 A3 | 5/2010 |
| WO | WO 2010/064005 A1 | 6/2010 |
| WO | WO 2010/129461 A2 | 11/2010 |
| WO | WO 2010/129461 A3 | 11/2010 |
| WO | WO 2010/129920 A1 | 11/2010 |
| WO | WO 2011/073934 A1 | 6/2011 |
| WO | WO 2011/077088 A1 | 6/2011 |
| WO | WO 2011/107698 A2 | 9/2011 |
| WO | WO 2011/107698 A3 | 9/2011 |
| WO | WO 2011/141654 A2 | 11/2011 |
| WO | WO 2011/141654 A3 | 11/2011 |
| WO | WO 2011/141656 A2 | 11/2011 |
| WO | WO 2011/141656 A3 | 11/2011 |
| WO | WO 2012/069725 A1 | 5/2012 |
| WO | WO 2012/150391 | 11/2012 |
| WO | WO 2014/081539 A1 | 5/2014 |

OTHER PUBLICATIONS

Takizawa, K., et al., "Flammability Assessment of $CH_2=CFCF_3$ (R-1234yf) and its Mixtures with $CH_2F_2$ (R-32); 2010 International Symposium on Next-generation Air Conditioning and Refrigeration Technology," Tokyo, JP, Feb. 17-19, 2010, pp. 1-8.

"Definitions: Humidity," Healthy Heating, May 18, 2008, 4 pages, XP002594956, http://web.archive.org/web/20080518174151/http://www.healthyheating.com/Thermal_Comfort_Working_Copy/Definitions/humidity.htm.

Translated Excerpt from Japanese Official Action dated Mar. 3, 2015 in corresponding Japanese Patent Application No. 2013-0509593, Japan Patent Office, 1 page.

* cited by examiner

REFRIGERANT COMPOSITION

The present invention relates to liquid refrigerants capable of being used in various types of compression systems as a replacement for the refrigerant R-404A.

The use of liquid refrigerant in compression refrigeration systems is very widespread in the fields of industrial, commercial and domestic refrigeration.

The problems presented by substances which deplete the atmospheric ozone layer (ODP: ozone depletion potential) were dealt with at Montreal, where the protocol was signed imposing a reduction in the production and use of chlorofluorocarbons (CFCs). This protocol has formed the subject of amendments which have required the abandoning of CFCs and have extended regulation to other products, including hydrochlorofluorocarbons (HCFCs).

The refrigeration industry and the industry for the production of air conditioning have invested a great deal in the replacement of these liquid refrigerants and it is because of this that hydrofluorocarbons (HFCs) have been marketed.

The contribution to the greenhouse effect of a fluid is quantified by a criterion, the GWP (Global Warming Potential), which summarizes the heating power by taking a reference value of 1 for carbon dioxide.

The liquid refrigerant R-404A is a mixture of fluoroethanes, i.e. R-143a, R-125 and R-134a, having a GWP of 3944. This fluid has a high GWP, predominantly because of the presence of R-143a, which has a GWP of 4470.

A fluid having a high GWP requires being replaced. There thus exists a major need to develop a replacement fluid for R-404A which can operate in the same compression systems.

According to a first aspect, the invention thus relates to compositions comprising at least from 36 to 39% by weight of difluoromethane (HFC-32), from 28 to 32% by weight of pentafluoroethane (HFC-125) and from 31 to 35% by weight of tetrafluoroethane (HFC-134a).

Preferably, the compositions according to the invention are characterized in that the sum of the weights of the compounds HFC-32, HFC-125 and HFC-134a is equal to 100%.

In one embodiment according to the invention, preference is given to the composition consisting of 37% by weight of difluoromethane (HFC-32), 30% by weight of pentafluoroethane (HFC-125), and 33% by weight of tetrafluoroethane (HFC-134a).

One possibility offered by the present invention is the use of the abovementioned compositions as liquid refrigerant.

In a preferred embodiment, the compositions according to the invention are used as a replacement for R-404A.

The invention also relates to a refrigeration process comprising at least one stage of condensation followed by one stage of evaporation of a composition described above.

In a preferred embodiment, the process according to the invention comprises a stage of condensation carried out at a temperature of greater than 13° C., preferably of greater than 24° C.

According to a very particularly preferred embodiment, the process according to the invention comprises a stage of evaporation carried out at a temperature of less than or equal to −10° C.

Another subject matter of the invention is a device for transfer of heat in a compression cycle including a composition described above.

The performance of the mixture, denoted "Mixture 1", consisting of 37% by weight of difluoromethane (HFC-32), 30% by weight of pentafluoroethane (HFC-125) and 33% by weight of tetrafluoroethane (HFC-134a), is compared with that of R-404A by simulating the performances with the Cycle D, NIST, version 5.0, software under the following operating conditions and are presented below:

Evaporation temperature: −32° C.
Condensation temperature: 43° C.
Subcooling: 5° C.
Superheat: 5° C.
Refrigerating capacity: 10 kW
Isentropic coefficient of the compressor: 0.7

The GWP is calculated according to the 4th report of the IPCC (2007).

| Refrigerant | R-404A | Mixture 1 |
|---|---|---|
| GWP | 3922 | 1722 |
| Evaporation pressure (bar) | 1.8 | 1.6 |
| Condensation pressure (bar) | 19.3 | 20.6 |
| Volumetric refrigerating capacity (kJ/m$^3$) | 912 | 998 |
| Coefficient of performance | 1.4 | 1.5 |
| Flow rate by weight (kg/h) | 375 | 233 |

The performance of the "Mixture 1" at different condensation and evaporation temperatures is presented below and compared with that of R404A:

| | Refrigerant R-404A | | | | | | | |
|---|---|---|---|---|---|---|---|---|
| GWP | 3922 | | | | | | | |
| Condensation temperature (° C.) | 13 | 24 | 35 | | | 43 | | |
| Evaporation temperature (° C.) | −32 | −32 | −10 | −20 | −32 | −10 | −20 | −32 |
| Evaporation pressure (bar) | 1.8 | 1.8 | 4.3 | 3.0 | 1.8 | 4.3 | 3.0 | 1.8 |
| Condensation pressure (bar) | 8.8 | 12.0 | 15.9 | 15.9 | 15.9 | 19.3 | 19.3 | 19.3 |
| Volumetric refrigerating capacity (kJ/m$^3$) | 1343 | 1191 | 2589 | 1738 | 1032 | 2318 | 1547 | 912 |
| Coefficient of performance | 3.1 | 2.3 | 3.2 | 2.3 | 1.7 | 2.5 | 1.9 | 1.4 |
| Flow rate by weight (kg/h) | 254 | 287 | 296 | 310 | 331 | 330 | 349 | 375 |
| Volumetric refrigerating capacity with respect to R-404A (%) | — | — | — | — | — | — | — | — |
| COP with respect to R-404A (%) | — | — | — | — | — | — | — | — |

| | Refrigerant Mixture 1 | | | | | | | |
|---|---|---|---|---|---|---|---|---|
| GWP | 1722 | | | | | | | |
| Condensation temperature (° C.) | 13 | 24 | 35 | | | 43 | | |
| Evaporation temperature (° C.) | −32 | −32 | −10 | −20 | −32 | −10 | −20 | −32 |
| Evaporation pressure (bar) | 1.6 | 1.6 | 3.9 | 2.7 | 1.6 | 3.9 | 2.7 | 1.6 |

-continued

| | | | | | | | | |
|---|---|---|---|---|---|---|---|---|
| Condensation pressure (bar) | 9.2 | 12.6 | 16.9 | 16.9 | 16.9 | 20.6 | 20.6 | 20.6 |
| Volumetric refrigerating capacity (kJ/m$^3$) | 1308 | 1199 | 2746 | 1838 | 1084 | 2541 | 1697 | 998 |
| Coefficient of performance | 2.9 | 2.2 | 3.1 | 2.4 | 1.7 | 2.5 | 1.9 | 1.5 |
| Flow rate by weight (kg/h) | 178 | 194 | 201 | 207 | 215 | 217 | 224 | 233 |
| Volumetric refrigerating capacity with respect to R-404A (%) | 97 | 101 | 106 | 106 | 105 | 110 | 110 | 109 |
| COP with respect to R-404A (%) | 95 | 99 | 98 | 100 | 102 | 101 | 104 | 106 |

The invention claimed is:

1. A composition comprising:
   a. from 36 to 39% by weight of difluoromethane (HFC-32);
   b. from 28 to 32% by weight of pentafluoroethane (HFC-125);
   c. from 31 to 35% by weight of tetrafluoroethane (HFC-134a).

2. The composition as claimed in claim 1, in which the sum of the weights of the compounds HFC-32, HFC-125 and HFC-134a is equal to 100%.

3. The composition as claimed in claim 1, consisting of:
   a. 37% by weight of difluoromethane (HFC-32);
   b. 30% by weight of pentafluoroethane (HFC-125);
   c. 33% by weight of tetrafluoroethane (HFC-134a).

4. A refrigeration process comprising the use of a composition as claimed in claim 1 as refrigerant.

5. The refrigeration process use as claimed in claim 4, wherein the refrigerant is a replacement for R-404A.

6. A refrigeration process comprising the following stages:
   a. condensation of a composition as claimed in claim 1;
   b. evaporation of said composition.

7. The process as claimed in claim 6, in which the condensation stage is carried out at a temperature of greater than 13° C.

8. The process as claimed in claim 6, in which the evaporation stage is carried out at a temperature of less than or equal to −10° C.

9. A device for transfer of heat in a compression cycle including the composition as claimed in claim 1.

10. The process as claimed in claim 6, in which the condensation stage is carried out at a temperature of greater than 24° C.

11. The process as claimed in claim 10, in which the evaporation stage is carried out at a temperature of less than or equal to −10° C.

12. The process as claimed in claim 7, in which the evaporation stage is carried out at a temperature of less than or equal to −10° C.

* * * * *